April 23, 1940.  J. A. COXE  2,197,779
REEL
Filed July 13, 1936   3 Sheets-Sheet 1
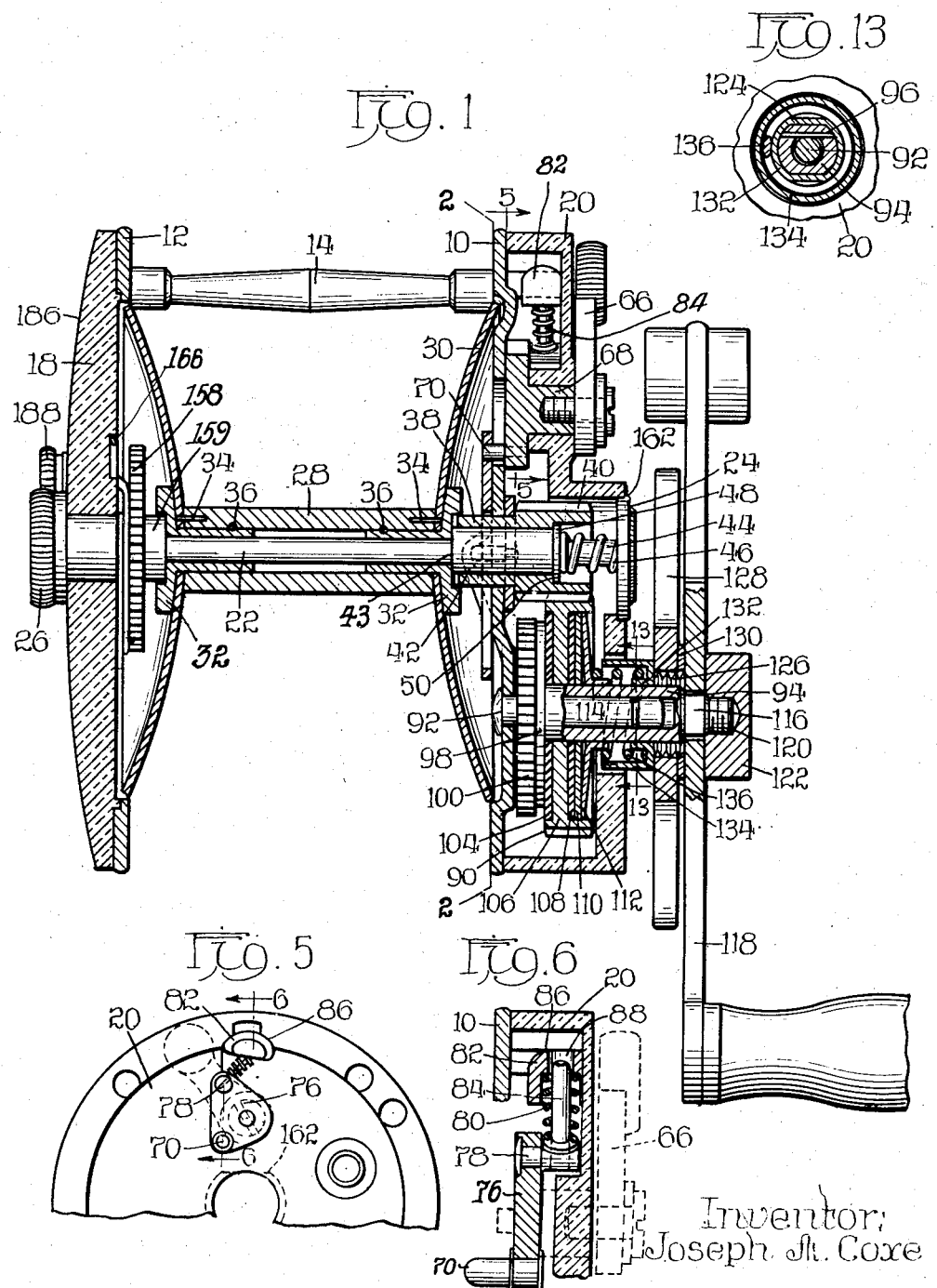
Inventor:
Joseph A. Coxe
Attys.

April 23, 1940.  J. A. COXE  2,197,779
REEL
Filed July 13, 1936  3 Sheets-Sheet 2
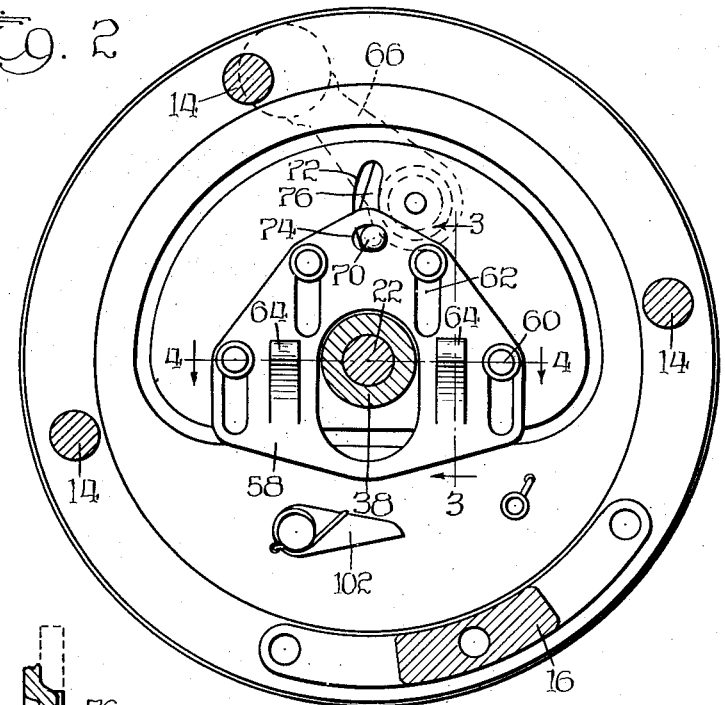
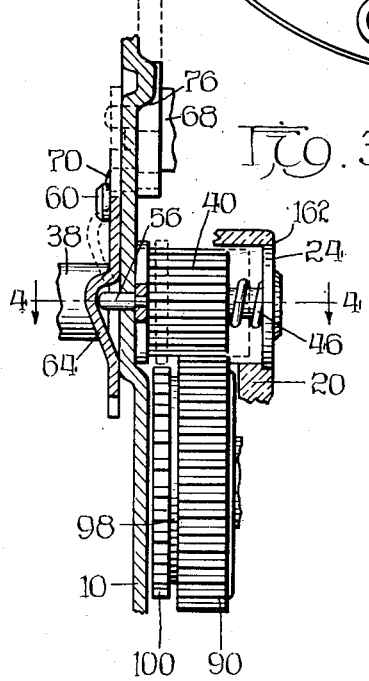
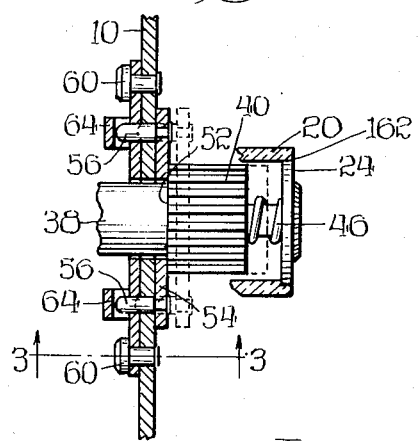
Inventor:
Joseph A. Coxe
By Freeman, Sweet, Albert & Weidman
Attys.

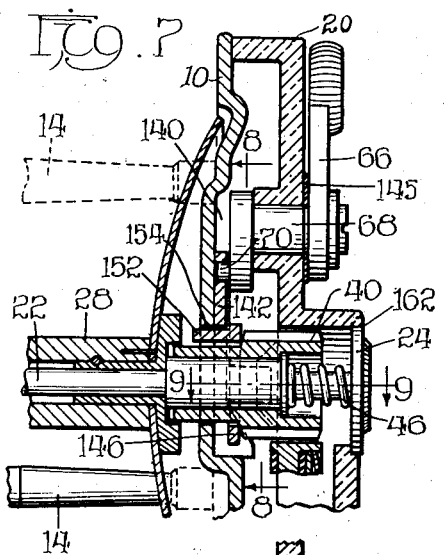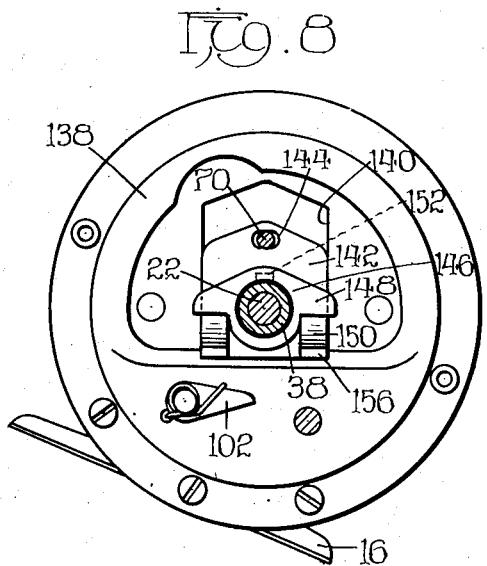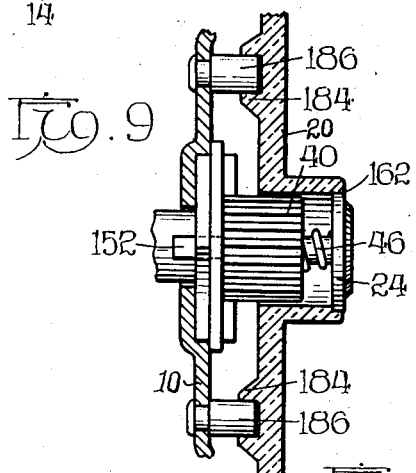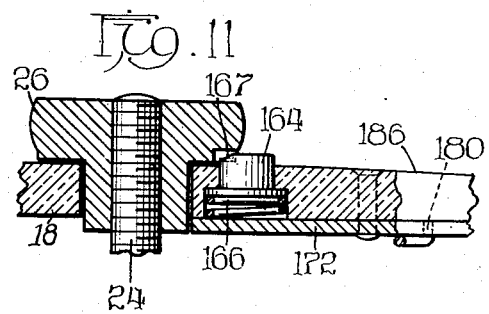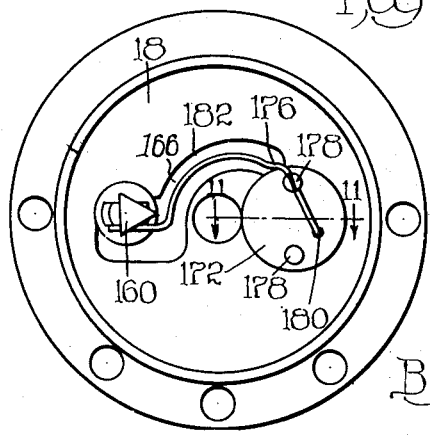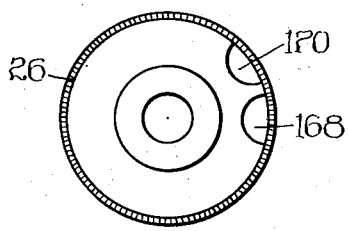

Patented Apr. 23, 1940

2,197,779

UNITED STATES PATENT OFFICE 2,197,779

REEL

Joseph A. Coxe, Los Angeles, Calif., assignor to Bronson Reel Company, Bronson, Mich., a corporation of Michigan Application July 13, 1936, Serial No. 90,369

21 Claims. (Cl. 242—84.7)

The invention relates to fishing reels, and includes among its objects and advantages an improvement in simplicity and protection from dirt under service conditions in a free spool reel of the stationary shaft type.

In the accompanying drawings:

Figure 1 is a central section through an assembled reel according to the invention;

Figure 2 is a section on line 2—2 of Figure 1;

Figure 3 is a section on line 3—3 of Figure 2 and Figure 4;

Figure 4 is a section on line 4—4 of Figure 2 and Figure 3;

Figure 5 is a fragmentary view of the inner face of the head end plate and the actuating lever carried thereby on line 5—5 of Figure 1;

Figure 6 is a section on line 6—6 of Figure 5;

Figure 7 is a partial section similar to Figure 1, showing a modified clutch shifting means;

Figure 8 is a section on line 8—8 of Figure 7;

Figure 9 is a section on line 9—9 of Figure 7;

Figure 10 is a view of the inner face of the tail plate of Figure 1;

Figure 11 is an enlarged section on line 11—11 of Figure 10;

Figure 12 is a view of the inner end of the fastening nut of Figure 11; and

Figure 13 is a section on line 13—13 of Figure 1.

In the embodiment of the invention selected for illustration, the metal head plate 10 and tail ring 12 are united into a rigid frame as by means of pillars 14 and a rod plate 16. The tail of the reel is closed by a Bakelite cover plate 18, and the mechanism at the head end of the reel is partly supported and housed by the Bakelite housing 20. The housing 20 and tail cover 18 are pulled together by the tension bolt or shaft 22 which also forms a journal on which the spool rotates. The bolt 22 has an integral flange 24 at the head end and engages a threaded nut 26 at the tail end by means of which the parts may be securely fastened together.

The spool assembly comprises the sleeve 28, the end bells 30, and the end bushings 32. The end bells 30 are keyed against rotation by pins 34. After assembly of the end bells with the sleeve 28, the duplicate bushings 32 are fastened in place, as by pressing them in, or by keys 36. Each bushing 32 includes the female portion of a clutch, such, for instance, as that illustrated and described in the co-pending application of John V. Schafer, Serial Number 4,731, filed February 4, 1935. The male portion of the clutch is at the inner end of the sleeve 38, which also constitutes a drive pinion for the spool, having teeth 40 at its outer end for that purpose.

The sleeve 28 and bushings 32 define a cavity around the bolt 22 to receive a supply of lubricant, and spaced bearings between spool and shaft. The shaft has an enlarged journal 42 on which the sleeve 38 may slide axially into and out of clutching engagement with the spool shaft. To the right of the large journal 42 the bolt 22 has a portion of reduced diameter 44, supporting the helical compression spring 46 and the abutment washer 48. The inner surface of the sleeve 38 has a shoulder at 50 adapted to abut the washer 48. It will be obvious that, in the position of Figure 1, the spring 46 pushes the washer 48 against the journal portion 42, and the shoulder 50 on the sleeve holds the sleeve in the position shown and in clutching engagement with the spool shaft.

To move the parts out of clutching engagement it is only necessary to push the sleeve 38 to the right. The outer surface of the sleeve 38 has a shoulder 52 which rides on a carrying plate 54. In the position of Figure 1, the carrying plate 54 rests against the head end plate 10, and spaced pins 56, at opposite ends of the plate, project through registering openings in the head end plate 10. The cam plate 58 is guided in rectilinear movement by four headed pins 60 passing through slots 62 in the cam plate. The portion of the cam plate underlying the ends of the pins 56 is die-formed to the cam shape best illustrated in Figure 3, including the gently inclined cam portion 64. It will be apparent that movement of the plunger plate 58 from the full line to the dotted line position of Figure 3 will cam up the pins 56 and lift the sleeve 38 out of clutching engagement with the spool.

Suitable means have been provided for moving the plunger plate to either of the positions of Figure 3 and resiliently holding it in either position. The shift lever 66 is mounted on the shaft 68 pivoted in the Bakelite head cap 20 and carrying an inner crank arm at 70. The crank arm 70 projects through an arcuate slot 72 in the head end plate 10 and into a short slot 74 in the adjacent corner of the plunger plate 60.

Referring more particularly to Figure 5, the crank 70 is mounted at one corner of a triangular plate 76. At the other corner the pin 78 receives the thrust of a compression spring 80 acting against an abutment 82. The compression spring 80 is held in place by a pin 84 telescoped within it and riveted into a transverse bore in the pin 78. The abutment 82 is a cupshaped block having a seat at 86 against the Bakelite head cap. The pin 84 projects through an opening 88 in the bottom of the abutment 82 whereby sufficient clearance is provided for the movement of the parts, including rotation of the cup 82 in its seat.

The pinion teeth 40 mesh with the drive gear 90. The stud 92 is riveted in the head end plate 10. On the stud, the tubular drive shaft 94 is rotatably mounted, being held against axial movement by a cross pin 96, see Figure 13, entering a groove in the stud. The shaft 94 includes the flange 98 carrying ratchet teeth 100 cooperating with a spring pressed pawl 102 to keep the shaft from rotating in the direction of reeling out. Above the flange 98 lie the lower friction washer 104, the reduced web 106 of the gear 90, the upper friction washer 108, the metal distributor washer 110, and the metal spring washer 112 having a short metal sleeve portion 114. At its upper end the shaft 94 carries a reduced squared portion 116 to receive the crank 118, and a threaded tip 120 to receive the nut 122.

Below the portion 116, the shaft 94 has a portion with two flat sides 124 and threads 126 on the remaining arcuate portions. The distributor washer 110 and the spring washer 112 are shaped to fit the flat sides 124, and turn with the shaft 94. The star wheel 128 is supported on the threads 126 and its upward movement limited by the washer 130. Below the star-wheel is a thrust sleeve including an inner sleeve portion 132 fitting the flat sides 124, and a larger outer portion 134. In the annular space between sleeve portions 132 and 134 lies the compression spring 136, abutting at its lower end against the spring washer 112, which spring washer is materially stiffer against axial yielding than the spring 136. It will be apparent that during rotation of the star wheel to move it to the left from the position of Figure 1, there will be three different ranges of adjustment; the first range will correspond to the compression of the spring 136, and during this range the friction loads will be light and can be adjusted by the operator with great precision. This range may advantageously be designed for trolling heavy baits, as well as for playing the catch when the line is light or the fish small. The second range begins when the sleeve portion 134 comes into contact with the spring washer 112. Thereafter, the friction forces available are several times larger than those obtainable during the first range. This is the range that will usually be used when a fish of the size for which the reel is intended is running out. The final, or emergency, range begins when the spring washer 112 is completely flattened and a direct thrust connection is established to receive the force of the star wheel. In this range forces up to the maximum safe load on the reel can be exerted. In reels of certain sizes, the distributor washer 110 is desirable to eliminate any tendency of the edge of the washer 112 to groove the face of the friction washer 108.

A relatively high degree of precision in manufacture and careful hand assembly are required when springs 136 and 112 are not employed, to avoid irregular and erratic action of the friction discs. Such action usually takes the form of alternate slipping and seizing, which upsets the equilibrium of the angler and unnecessarily excites and alarms the fish by delivering a series of jerks. Either spring enables a factory assembled unit to deliver a substantially perfectly smooth pull, and the use of two springs of different strength provides a more precise control of the adjustment for light loads than would otherwise be obtainable.

In the embodiment of the invention illustrated in Figures 7, 8, and 9, the head end plate 138 is recessed at 140 to receive and guide the cam plate 142, which is a simple U-shaped piece of metal entirely guided and supported by the head end plate 138. The bight of the cam plate is provided with a slot 144 to receive the actuating pin 70 of the shift lever 66, which actuating pin and shift lever may be identical with those of Figure 1, except for the use of a very light friction washer 145. Above the cam plate 142 rides the yoke 146 having a portion encircling the sleeve 38 of the pinion 40 and arms 148 extending in opposite directions to ride up over the cams 150 on the ends of the arms of the cam plate 142. Alignment of the yoke 146 is secured by turning down a lug 152 from the material punched out to form the central hole of the yoke, which lug slides in a notch 154 in the head end plate 138.

The spring 46 and thrust collar 50 for forcing the sleeve 38 into clutching engagement with the spool may be identical with Figure 1. In both embodiments the journal 42 and sleeve 38 have such dimensions that with the spool in abutment with one end of the journal 42 and the washer 50 in abutment with the other end, the sleeve 38 has a few thousandths of an inch of axial clearance between its own abutments with the washer 50 and the bottom of the female clutch member in the bushing 32. This enables the journal 42 to carry the axial thrust of the spring 46, rather than letting it go through the spool and impose a friction load on the abutment surface at the inner end of the nut 26.

I have found that reliable operation without danger of stopping at any intermediate position may be obtained with such a construction because the resistance to rotation of the lever 66 when the parts are being disconnected is large as long as the arms are riding up the inclined portion of the cams 150, but when the toes 156 of the cams begin to ride under the yoke 146, the abrupt decrease of the resistance is such that it is impossible for the operator in ordinary operation to relax and discontinue the application of force before the lever is moved to its extreme position. Similarly, movement in the opposite direction is opposed by predetermined friction until the toes ride out from under the yoke and then the mechanism offers so much less resistance to the rest of the movement that the parts will be reliably returned to the positions of Figures 7 and 8.

The click wheel 158 is driven by the clutch portion of the bushing 32 at the left in Figure 1, which engages its hub 159, and is positioned to cooperate with a triangular click 160 (see Figure 10) similar to that described in the copending application of Joseph A. Coxe, Serial Number 65,944, filed February 27, 1936. Upon reference to Figure 1 it will be apparent that the end play of the spool and click wheel is controlled by the shoulder 43 at the end of the journal 42 of the shaft 22, and the adjustment of the end nut 26. To assure realization of the maximum advantages of the stationary shaft construction in use, the parts are arranged so that precise adjustment of this can be made at the factory and will automatically be secured by the user thereafter.

The position of the bolt 22 itself is determined by flattening one side of the flange 24 and providing a corresponding shape in Bakelite plate 20, as illustrated at 162 in Figures 1 and 5.

Referring to Figures 10, 11, and 12, the locking pin 164 for locking the nut 26 is resiliently urged into the locking position of Figure 11 by the spring 166. It projects above the surface of the tail plate 18 by a distance about 5/1000 of an inch less than the pitch of the screw threads of the nut 26. A segment of the end of the pin is milled away to form a cam surface 167, as described in the co-pending application of Joseph A. Coxe, Serial Number 9,032, filed March 2, 1935. At the factory, the parts are assembled as in Figure 1, and the nut 26 turned down to give perfect freedom of rotation to the spool, but practically without end play. Then a mark is made on the nut 26, and the nut is removed and a single serration 168 (see Figure 12) is milled into the nut at the precise position corresponding with perfect adjustment. This completes the device, as I prefer to make it. However, reels have in the past so universally been sold in a condition requiring the user to adjust the end play of the spool, that certain users would distrust the accuracy of the adjustment. Accordingly, I provide only one additional serration at 170, positioned to permit the spool an end play of about two thousandths of an inch. This is sufficient to be readily detected with a sensitive hand by feeling of the spool, so that the user can employ either adjustment and convince himself that the spool does not bind in either position.

The same fastening plate 172 which supports the actuating spring 176 for the click 160 underlies the spring 166 to hold the spring and locking pin 164 in the position of Figure 11. The pawl spring 176 has been illustrated as a single wire lying in a kerf in the end of one of the fasteners 178 for the plate 172, and having its butt end turned down into a socket hole 180 in the plate 172. The tail plate is countersunk at 182 to house the arcuate portion of the spring 176. To assure correct orientation of the bolt 22, the head end plate 20 is provided with separate bosses 184 to receive aligning pins 186 on the head plate 10. Accordingly, the user of the reel can take it entirely to pieces for cleaning and assembly, and after the parts are placed in assembled position, the nut 26 is screwed home. The pin 164 will not engage the nut until the last turn of the nut necessary to bring the nut into perfectly adjusted position, and then it will snap twice, first into the position for loose adjustment, and second, into the position for snug adjustment, and the user can leave the nut in either position desired. There are no other locked positions in which the user can leave the nut, so that danger of operation with the parts improperly adjusted is completely avoided.

The tail plate 18 has a substantially flat inner surface, but its outer surface is a dome 186 of slight convexity, having relatively small flat portions forming seats for the nut 26 and for the button 188 for moving the click 160 into and out of operative position. The thickness near the center of the tail plate is substantially double that at the outer edge, and this increases the strength of the plate about four fold and the rigidity about eight fold. An equally significant advantage is the grip the user can get on the reel. With a flat outer surface the edge of the surface tends to make grooves in the palm of the user's hand, especially when playing a heavy fish. The dome shape illustrated raises the central projection at 26 and 188 enough so that they press into the center of the user's palm enough to keep him conscious of the position of his hand, and the convexity of the plate itself approaches the natural concavity of the palm of the hand enough to give a very comfortable feeling and avoid muscle strain. This additional pressure against the palm of the hand is not enough to prevent an effective grip at the edge, where the main forces are still exerted, but it does ease the palm of the user, and it facilitates shifting the hand a little from time to time to avoid cramps.

Without further elaboration, the foregoing will so fully explain the invention that others may, by applying knowledge current at the time of application, readily adapt the same for use under various conditions of service.

I claim:

1. In a free spool fishing reel, in combination: a head frame plate; a tail ring; pillars and a rod seat connecting said plate and ring into a rigid frame; a spool having a tubular shaft, insertible into assembled position through said tail ring; a tail cover plate; a head cover plate; a tension bolt shaft extending through said head cover plate, head frame plate, spool, and tail cover plate; an axially shiftable clutch member encircling said shaft adjacent said head frame plate; spring means encircling said shaft and urging said clutch member into clutching engagement; clutch actuating cam means slidable on said head frame plate; rotary clutch operating means carried by said head cover plate for operating said clutch actuating means, and including an externally accessible lever; said tension bolt and head cover plate having registering irregularities of contour permitting assembly in only one predetermined position; threaded means at the tail end of said shaft for fastening all said parts together; said threaded means being constructed and arranged to determine by its adjustment the end play of said spool; and locking means for said threaded means constructed and arranged to be operative to lock said threaded means only in two predetermined positions in both of which said spool has proper end play; one of said positions allowing substantially no end play, and the other allowing appreciable end play less than enough to affect the operation of said clutch member.

2. In a free spool fishing reel, in combination: a head frame plate; a tail ring; connections uniting said plate and ring into a rigid frame; a spool insertible into assembled position through said tail ring; a tail cover plate; a head cover plate; a shaft extending through said head cover plate, head frame plate, spool, and tail cover plate; an axially shiftable clutch member encircling said shaft adjacent said head frame plate; spring means urging said clutch member into clutching engagement; clutch actuating cam means slidable on said head frame plate; clutch operating means carried by said head cover plate for operating said clutch actuating means; said shaft and head cover plate having registering irregularities of contour permitting assembly in only one predetermined position; threaded means at the tail end of said shaft for fastening all said parts together; said threaded means being constructed and arranged to determine by its adjustment the end play of said spool; and locking means for said threaded means constructed and arranged to be operative to lock said threaded means only in positions in which said spool has proper end play.

3. In a fishing reel, in combination: a head frame plate; a tail ring; connections uniting said plate and ring into a rigid frame; a spool insertible into assembled position through said tail ring; a tail cover plate; a head cover plate; a shaft extending through said head cover plate, head frame plate, spool, and tail cover plate; threaded means at the tail end of said shaft for fastening all said parts together; said threaded means being constructed and arranged to determine by its adjustment the end play of said spool; and locking means for said threaded means constructed and arranged to be operative to lock said threaded means only in positions in which said spool has proper end play.

4. In a free spool fishing reel, in combination: a head frame plate; a tail ring; connections uniting said plate and ring into a rigid frame; a spool having a tubular shaft; a tail cover plate; a head cover plate; a stationary shaft extending through said head cover plate, said frame plate, spool, and tail cover plate; an axially shiftable clutch member encircling said shaft adjacent said head frame plate; spring means encircling said shaft and urging said clutch member into clutching engagement with said spool; clutch actuating cam means slidable on said head frame plate; and rotary clutch operating means carried by said head cover plate for operating said clutch actuating means, and including an externally accessible lever.

5. In a free spool fishing reel, in combination: a head frame plate; a tail ring; connections uniting said plate and ring into a rigid frame; a spool having a tubular shaft; a tail cover plate; a head cover plate; a stationary bolt extending through said head cover plate, head frame plate, spool, and tail cover plate; an axially shiftable clutch member encircling said bolt adjacent said head frame plate; spring means urging said clutch member into clutching engagement with said spool; externally accessible means for operating said clutch; and abutment means positioned to limit the action of said spring means, whereby when said clutch is engaged, the parts may turn without a friction load imposed by said spring means.

6. In a fishing reel, in combination: a frame; a spool; a stationary spool shaft; said frame supporting said shaft and said shaft supporting said spool, threaded means at one end of said spool shaft constructed and arranged to determine the end play of said spool; and locking means for said threaded means including a detent resiliently movable through less effective axial displacement than that of said threaded means during one revolution; said threaded means having irregularities of contour capable of locking engagement with said locking means only in a limited number of predetermined positions, whereby the user is unable to assemble the parts in locked position except with a spool adjustment predetermined at the factory.

7. In a fishing reel, in combination: a frame; a spool; a stationary spool shaft; said frame supporting said shaft and said shaft supporting said spool, threaded means at one end of said spool shaft constructed and arranged to determine the end play of said spool; and locking means for said threaded means capable of locking engagement with said threaded means only in a limited number of predetermined positions, whereby the user is unable to assemble the parts in locked position except with a spool adjustment predetermined at the factory.

8. In a fishing reel, in combination: a frame; a spool; a stationary spool shaft; said frame supporting said shaft and said shaft supporting said spool; threaded means at one end of said spool shaft constructed and arranged to determine the end play of said spool; and locking means for said threaded means including a detent resiliently movable through less effective axial displacement than that of said threaded means during one revolution; said threaded means having irregularities of contour capable of locking engagement with said locking means only in predetermined positions, in each of which the spool has proper predetermined end play.

9. In a free spool fishing reel, in combination: a rigid frame; a stationary shaft; a spool rotatable on said shaft; said spool including a sleeve of larger inside diameter than the diameter of said shaft, duplicate bushings in the ends of said sleeve bearing on said shaft, said bushings having end flanges, end bells clamped between said flanges and the adjacent ends of said sleeve and keyed to said sleeve, and duplicate clutch members formed in the exposed ends of said bushings; a driving clutch on said shaft to engage one of said clutch members; and a click wheel on the other end of said shaft driven by the other clutch member.

10. In a free spool fishing reel, in combination: a rigid frame; a stationary shaft supported thereby; a spool rotatable on said shaft; said spool including a sleeve of larger inside diameter than the diameter of said shaft, duplicate bushings in the ends of said sleeve bearing on said shaft, said bushings having end flanges, end bells clamped between said flanges and the adjacent ends of said sleeve and keyed to said sleeve, and duplicate clutch members formed in the exposed ends of said bushings; and a driving clutch on said shaft to engage one of said clutch members.

11. In a fishing reel, in combination: a rigid frame; a stationary shaft supported thereby; and a spool rotatable on said shaft; said spool including a sleeve of larger inside diameter than the diameter of said shaft, duplicate bushings in the ends of said sleeve bearing on said shaft, said bushings having end flanges, and end bells clamped between said flanges and the adjacent ends of said sleeve and keyed to said sleeve.

12. In a fishing reel, in combination: a rigid frame; a stationary shaft supported thereby; and a spool rotatable on said shaft; said spool including a sleeve of larger inside diameter than the diameter of said shaft, duplicate bushings in the ends of said sleeve bearing on said shaft, said bushings having end flanges, and end bells clamped between said flanges and the adjacent ends of said sleeve.

13. In a free spool fishing reel, in combination: a rigid frame; a shaft supported thereby; a spool on said shaft; said spool including a sleeve, duplicate bushings in the ends of said sleeve, said bushings having end flanges, end bells clamped between said flanges and the adjacent ends of said sleeve and keyed to said sleeve, and duplicate clutch members formed in the exposed ends of said bushings.

14. In a free spool fishing reel, in combination: a rigid frame; a shaft supported thereby; a spool on said shaft; said spool including a sleeve, duplicate bushings in the ends of said sleeve, said bushings having end flanges, and duplicate clutch members formed in the exposed ends of said bushings.

15. In a free spool fishing reel, in combination: a head frame plate; a housing overlying said head frame plate and defining a housed space; an axially shiftable clutch member; a yoke underlying said clutch member; a slidable cam plate underlying said yoke; said head plate including guide means for said cam plate in the nature of a counter-sunk groove; a stationary central shaft passing through said clutch member and having a head engaging said housing to hold it in place; a compression spring encircling said shaft and abutting said head; a thrust washer abutting the end of said compression spring remote from said head; said clutch member having an abutment surface positioned to receive thrust from said thrust washer; said shaft having a shoulder lower than said clutch abutment surface, for limiting expansion of said spring; means carried by said housing for actuating said cam plate; and means carried by said head frame plate for rotating said clutch member in any position of axial adjustment.

16. In a free spool fishing reel, in combination: a head frame plate; a housing overlying said head frame plate and defining a housed space; an axially shiftable clutch member; means for actuating said clutch member in the nature of a yoke underlying said clutch member; means for actuating said yoke in the nature of a slidable cam plate underlying said yoke; said head plate including guide means for said cam plate in the nature of a counter-sunk groove; a central shaft passing through said clutch member and said head frame plate; a compression spring encircling said shaft; a thrust washer abutting one end of said compression spring; said clutch member having an abutment surface positioned to receive thrust from said thrust washer; means carried by said housing for actuating said cam plate; and means carried by said head frame plate for rotating said clutch member in any position of axial adjustment.

17. In a free spool fishing reel, in combination: a head frame plate; a housing overlying said head frame plate and defining a housed space; an axially shiftable clutch member; means for actuating said clutch member in the nature of a yoke underlying said clutch member: means for actuating said yoke in the nature of a slidable cam plate underlying said yoke; said head plate including guide means for said cam plate in the nature of a counter-sunk groove; a central shaft passing through said clutch member and said head frame plate; compression spring means pressing said clutch against said cam plate; means for actuating said cam plate; and means for rotating said clutch member in any position of axial adjustment.

18. In a free spool fishing reel, in combination: a head frame plate; a housing overlying said head frame plate and defining a housed space; an axially shiftable clutch member; means for actuating said clutch member in the nature of a yoke underlying said clutch member; means for actuating said yoke in the nature of a slidable cam plate underlying said yoke; said head plate including guide means for said cam plate in the nature of a counter-sunk groove; a central shaft passing through said clutch member and said head frame plate; a compression spring encircling said shaft and pressing said clutch against said cam plate; means for actuating said cam plate; and means for rotating said clutch member in any position of axial adjustment.

19. In a fishing reel, in combination: a sleeve; annular end bells having their inner peripheries in axial abutment with the ends of said sleeve to define an annular line receiving space; tubular retainers at the ends of said sleeve; each retainer including a flange engaging the outer surface of the adjacent end bell and extending radially outward beyond the inner radius of said line-receiving space at the adjacent end of the sleeve by a distance not less than the thickness of the adjacent end bell; each retainer including a portion extending axially inside said sleeve and rigidly fastened thereto; a stationary bolt passing through said sleeve; said inwardly extending retainer portions forming spaced bearings for rotatably supporting said sleeve on said bolt.

20. In a free spool fishing reel, in combination: spaced end plates; a stationary central pintle extending from one end plate to the other; a tubular spool assembly rotatably supported on said pintle; a tubular drive clutch supported on said pintle adjacent one end of said spool; said clutch and spool having clutch teeth shaped to move into and out of mesh axially; a clutch actuating member encircling said pintle for pushing said clutch member into meshing engagement with said spool; spring means urging said actuating member in the direction for engaging said clutch and spool; an abutment on said pintle positioned to abut said actuating member and limit its inward axial movement, to a position in which said clutch and spool have a predetermined axial clearance; and manual control means for withdrawing said clutch and lifting said actuating member off said abutment against the force of said spring means.

21. A combination according to claim 20 in which said stationary pintle and spool have stationary abutment means at both ends of the spool for determining the axial position of said spool independent of the position of said clutch member.

JOSEPH A. COXE.